(12) United States Patent
Korneluk et al.

(10) Patent No.: US 11,959,750 B2
(45) Date of Patent: *Apr. 16, 2024

(54) MOBILE TRANSCEIVER WITH ADAPTIVE MONITORING AND REPORTING

(71) Applicant: MALIKIE INNOVATIONS LIMITED, Dublin (IE)

(72) Inventors: José Eduardo Korneluk, Lake Worth, FL (US); Sandeep Chennakeshu, Austin, TX (US); Siddharth Saxena, Sunrise, FL (US); Sergio Javier Berriz, Miami, FL (US)

(73) Assignee: Malikie Innovations Limited, Dublin (IE)

( * ) Notice: Subject to any disclaimer, the term of this patent is extended or adjusted under 35 U.S.C. 154(b) by 149 days.

This patent is subject to a terminal disclaimer.

(21) Appl. No.: 17/483,930

(22) Filed: Sep. 24, 2021

(65) Prior Publication Data

US 2022/0011114 A1 Jan. 13, 2022

Related U.S. Application Data

(63) Continuation of application No. 16/750,396, filed on Jan. 23, 2020, now Pat. No. 11,156,463, which is a (Continued)

(51) Int. Cl.
*G01C 21/20* (2006.01)
*G01C 21/34* (2006.01)
(Continued)

(52) U.S. Cl.
CPC ............ *G01C 21/20* (2013.01); *G01C 21/34* (2013.01); *G01C 21/3453* (2013.01);
(Continued)

(58) Field of Classification Search
None
See application file for complete search history.

(56) References Cited

U.S. PATENT DOCUMENTS 8,175,802 B2 5/2012 Forstall
8,228,234 B2 7/2012 Paulson
(Continued)

FOREIGN PATENT DOCUMENTS

CN 1659804 8/2005
CN 102006550 4/2011
(Continued)

OTHER PUBLICATIONS

Office Action and English Translation; CN Application No. 201710005909 dated May 6, 2021.
(Continued)

*Primary Examiner* — Abdhesh K Jha
(74) *Attorney, Agent, or Firm* — Botos Churchill IP Law LLP

(57) ABSTRACT

A method and mobile transceiver with adaptive monitoring are provided. In accordance with one embodiment, there is provided a method of operating a mobile transceiver, comprising: waking up the mobile transceiver from a low power mode in response to a wakeup event; determining a waypoint in a travel itinerary corresponding to the wakeup event, the travel itinerary defining a number of waypoints including an origin endpoint and destination endpoint; and setting one or more subsequent wakeup events based one or a combination of a time of the wakeup event, sensor data at the time of the wakeup event, and the determined waypoint.

20 Claims, 4 Drawing Sheets

Related U.S. Application Data continuation of application No. 14/987,928, filed on Jan. 5, 2016, now Pat. No. 10,571,272.

(51) Int. Cl.
  *G01S 19/34* (2010.01)
  *H04W 52/02* (2009.01)

(52) U.S. Cl.
  CPC ......... *H04W 52/0254* (2013.01); *G01S 19/34* (2013.01); *Y02D 30/70* (2020.08)

(56) References Cited

U.S. PATENT DOCUMENTS

| | | | |
|---|---|---|---|
| 8,538,458 | B2 | 9/2013 | Haney |
| 9,177,282 | B2 | 11/2015 | Stevens et al. |
| 2001/0027614 | A1 | 10/2001 | Chickering, III et al. |
| 2003/0149526 | A1* | 8/2003 | Zhou ............... G01S 5/0027 701/408 |
| 2007/0056369 | A1 | 3/2007 | Cova |
| 2008/0291033 | A1* | 11/2008 | Aghassipour ........ G06Q 50/30 340/584 |
| 2009/0061897 | A1 | 3/2009 | Hamilton |
| 2010/0063726 | A1 | 3/2010 | Marjenberg |
| 2011/0050423 | A1 | 3/2011 | Cova et al. |
| 2012/0218146 | A1 | 8/2012 | Leclercq |
| 2015/0134557 | A1 | 5/2015 | Cova et al. |
| 2015/0253146 | A1 | 9/2015 | Annapurdeddy |

FOREIGN PATENT DOCUMENTS

| | | | |
|---|---|---|---|
| CN | 102713949 | 10/2012 | |
| CN | 104756040 | 7/2015 | |
| EP | 2293016 | 3/2011 | |
| WO | WO-2015063345 A1 * | 5/2015 | ......... G06Q 10/0832 |

OTHER PUBLICATIONS

European search report; EP16205798 dated May 22, 2017.
Communication Pursuant to Aritcle 94(3); EP16205798 dated Oct. 2, 2018.
Communication Pursuant to ARticle 94(3); EP16205798 dated Aug. 1, 2019.
Office Action; U.S. Appl. No. 16/750,396 dated Feb. 19, 2021.
Office Action; U.S. Appl. No. 14/987,928 dated Apr. 10, 2017.
Final Rejection; U.S. Appl. No. 14/987,928 dated Jul. 24, 2017.
Advisory Action; U.S. Appl. No. 14/987,928 dated Oct. 3, 2017.
Notice of Allowance; U.S. Appl. No. 14/987,928 dated Sep. 3, 2019.
Unknown Author; Hidden Markov Model, wikipedia, https:en.wikipedia.org./wiki/hidden_Markov_model Oct. 12, 2017.
Chao-Lin Wu, Yu-Te Huang, Cheng-lung Wu, Hao-hua chu, Polly Huang, An adaptvie duty-cycle sheme for GPS sceduling in mobile location sensting application. 2011.
Notice of Allowance; U.S. Appl. No. 16/750,396 dated Jun. 29, 2021.
Office Action for Canadian Patent Application No. 2,953,547, dated Oct. 18, 2023, 6 Pages.

* cited by examiner

MOBILE TRANSCEIVER WITH ADAPTIVE MONITORING AND REPORTING

RELATED APPLICATION DATA

The present application is a continuation of U.S. patent application Ser. No. 16/750,396, filed Jan. 23, 2020, which is a continuation of U.S. patent application Ser. No. 14/987,928, filed Jan. 5, 2016, the content of which is incorporated herein by reference in its entirety.

TECHNICAL FIELD

The present disclosure relates generally to mobile transceivers, and more specifically, to a method and mobile transceiver with adaptive monitoring and reporting.

BACKGROUND

Global Navigation Satellite System (GNSS) tracking devices, such as Global positioning system (GPS) tracking devices, are devices carried by objects or persons ("carriers") which measure the location of the carrier using the GNSS at regular intervals and typically store the location in internal memory. Examples of types of GNSS tracking devices include: a data logger, a data pusher and a data puller. A data logger may store the measured location data in internal memory for subsequent download and analysis. A data pusher (also known as a beacon) may send location data stored in internal memory to a server or other device in accordance with predefined parameters. A data puller (also known as a transponder) may store location data in internal memory and provides the location data in response to queries from a server or other device. GNSS tracking devices may have limited power and/or limited processing resources. Accordingly, methods of efficiently operating and deploying GNSS tracking devices may be desirable.

DESCRIPTION OF EXAMPLE EMBODIMENTS

Figure 1:
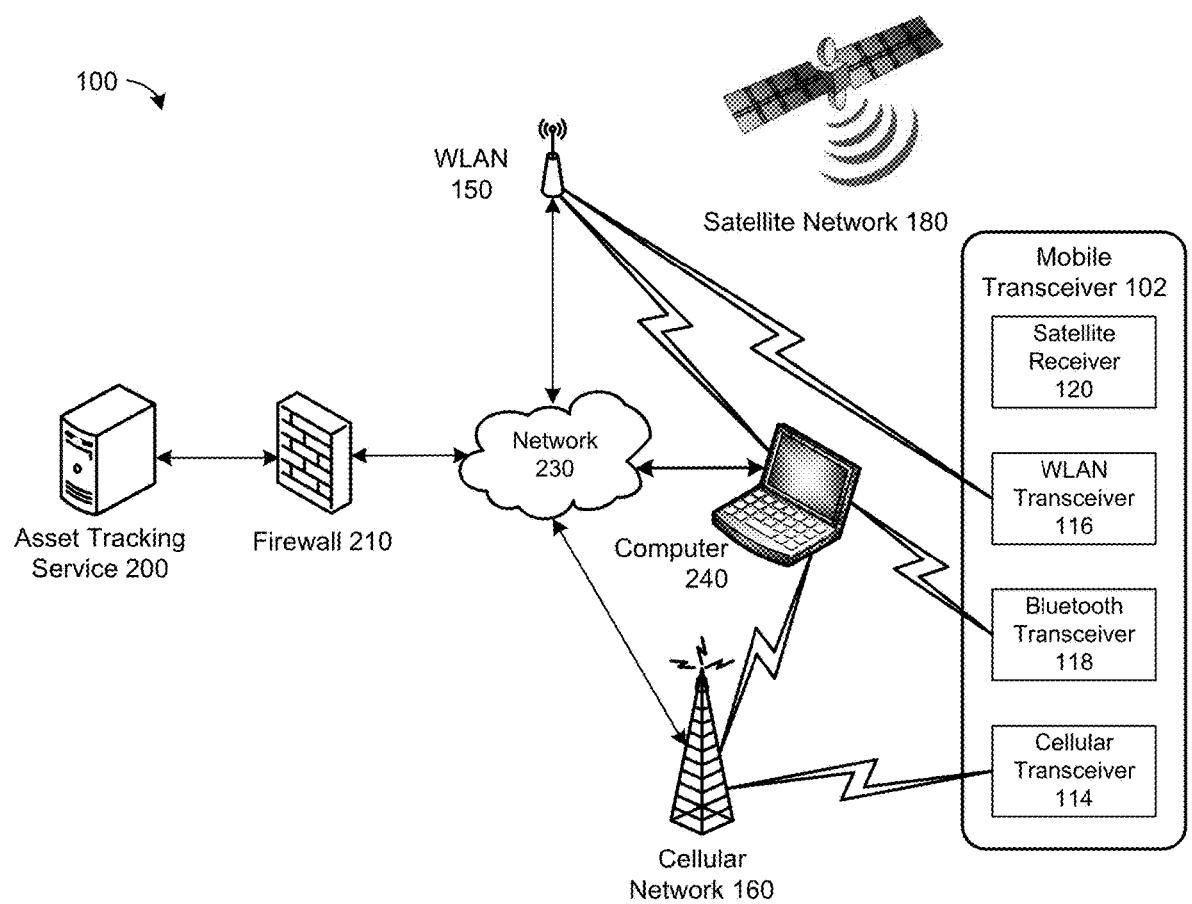
FIG. 1 is a block diagram illustrating a communication system suitable for operating a mobile transceiver in accordance with the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements can occur by way of messaging, function calls, shared memory space, and so on, without any such physical separation. As such, functions need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

The present disclosure provides a mobile transceiver that may allow global and long-range tracking applications in which an asset in global and long-range transit can be tracked even though it crosses wireless carrier and network coverage boundaries while in transit. In global and long-range tracking applications the mobile transceiver and the asset being tracked may cross wireless carrier and network coverage boundaries while in transit. For example, it is not uncommon for a shipping container to originate in mainland China and travel around South Africa with a final destination in North America.

In accordance with an example embodiment of one aspect of the present disclosure, there is provided a method of operating a mobile transceiver, comprising: waking up the mobile transceiver from a low power mode in response to a wakeup event; determining a waypoint in a pre-programmed travel itinerary corresponding to the wakeup event, the travel itinerary being stored in a memory of the mobile transceiver and defining a number of waypoints along a planned route and a wakeup frequency for each of the waypoints, wherein each of the waypoints define a location, and wherein the waypoints include an origin endpoint, a destination endpoint and intermediate locations between the origin endpoint and destination endpoint; and setting one or more subsequent wakeup events based one or a combination of a time of the wakeup event, sensor data at the time of the wakeup event, and the determined waypoint.

In accordance with another example embodiment of one aspect of the present disclosure, there is provided a method of operating a mobile transceiver, comprising: waking up the mobile transceiver from a low power mode in response to a wakeup event; determining a waypoint in a pre-programmed travel itinerary corresponding to the wakeup event, the travel itinerary being stored in a memory of the mobile transceiver and defining a number of waypoints along a planned route and a wakeup frequency for each of the waypoints, wherein each of the waypoints define a location, and wherein the waypoints include an origin endpoint, a destination endpoint and intermediate locations between the origin endpoint and destination endpoint; performing an action associated with the wakeup event; and setting one or more time-based wakeup events based on one or both of the determined waypoint and sensor data at a time of the wakeup event.

In accordance with a further example embodiment of one aspect of the present disclosure, there is provided a method of operating a mobile transceiver, comprising: waking up the mobile transceiver from a low power mode in response to a wakeup event; determining a waypoint in a travel itinerary corresponding to the wakeup event, the travel itinerary defining a number of waypoints including an origin endpoint and destination endpoint; performing an action associated with the wakeup event; determining a wakeup frequency associated with the determined waypoint; and setting a wakeup frequency of one or more subsequent wakeup events in accordance with the determined wakeup frequency.

In accordance with example embodiments of another aspect of the present disclosure, there is provided a mobile transceiver, comprising: a processor; a memory coupled t the processor; a wireless transceiver coupled to the processor; a satellite receiver coupled to the processor; wherein the mobile transceiver is configured to perform the methods described above and hereinafter. The mobile transceiver may be a Global Navigation Satellite System (GNSS) tracking device.

In accordance with example embodiments of a further aspect of the present disclosure, there is provided a non-transitory machine readable medium having tangibly stored thereon executable instructions that, when executed by a processor of a mobile transceiver, the mobile transceiver comprising a memory, and a wireless transceiver and a satellite receiver each coupled to the processor, wherein the executable instructions cause the mobile transceiver to perform the methods described above and hereinafter.

Figure 2:
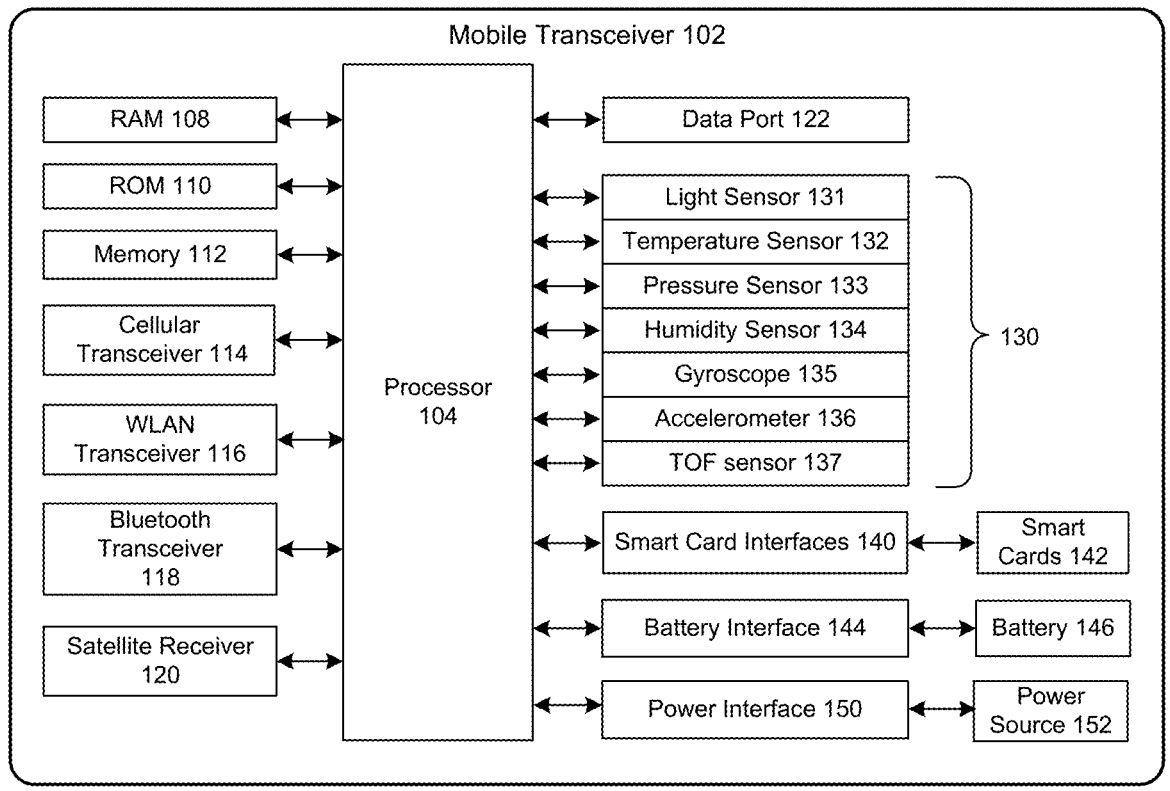
FIG. 2 is a block diagram illustrating a mobile transceiver in accordance with an example embodiment of the present disclosure.

Referring to FIGS. 1 and 2, an example embodiment of a mobile transceiver 102 of the present disclosure will be described. The mobile transceiver 102 comprises at least one processor 104 which controls the overall operation of the mobile transceiver 102. The processor 104 is coupled to a plurality of components via a communication bus (not shown) which provides a communication path between the components and the processor 104. The mobile transceiver 102 also comprises a Random Access Memory (RAM) 108, Read Only Memory (ROM) 110, a persistent (non-volatile) memory 112 which may be flash erasable programmable read only memory (EPROM) ("flash memory") or other suitable form of memory, a data port 122 such as a serial data port (e.g., Universal Serial Bus (USB) data port), and a plurality of environmental sensors 130 for sensing the environment of the mobile transceiver 102. The sensors 130 may comprise a light sensor 131, temperature sensor 132, pressure sensor 133, humidity sensor 134, gyroscope 135, accelerometer 136, one or more time-of-flight (ToF) sensors 137 and possibly other sensors such as a door contact switch (not shown).

The mobile transceiver 102 also comprises a satellite receiver 120 for receiving satellite signals from a satellite network 180 that comprises a plurality of satellites which are part of a global or regional satellite navigation system. In some embodiments, a satellite transceiver capable of both receiving and sending satellite signals may be provided instead of a satellite receiver which can only receive satellite signals.

The mobile transceiver 102 can use signals received by the satellite receiver 120 from a plurality of satellites in the satellite network 180 to determine its position. In at least some embodiments, the satellite network 180 comprises a plurality of satellites which are part of at least one Global Navigation Satellite System (GNSS) that provides autonomous geo-spatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The mobile transceiver 102 also comprises one or more wireless transceivers for exchanging at least data communication. The wireless transceivers comprises at least a cellular (RF) transceiver 114 for communicating with a plurality of different radio access networks (RAN) such as a cellular network 160 using different wireless data communication protocols and standards. The mobile transceiver 102 may communicate with any one of a plurality of fixed transceiver base stations (one of which is shown in FIG. 1) of the cellular network 160 within its geographic coverage area. The mobile transceiver 102 may send and receive signals over the cellular network 160 after the required network registration and/or activation procedures have been completed.

The cellular transceiver 114 is a multi-band transceiver that supports multiple radio frequency bands which may include, for example, multiple 4G Long-Term Evolution (LTE) or LTE Advanced bands as well as global 3G and 2G bands such as, for example, a TOBY-L2 series wireless transceiver from u-blox Holding AG of Switzerland. Multiple dedicated transceivers could be provided to support different wireless services, such as 4G LTE, 3G and 2G wireless services in other embodiments.

Examples of technologies that can be used by the cellular transceiver 114 include LTE, LTE Advanced, General Packet Radio Service (GPRS), Mobitex™, and Data TAC™. Other example technologies that can be used by the cellular transceiver 114 include Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of communication networks, both separate and integrated, may also be utilized with the mobile transceiver 102. The mobile transceiver 102 may also be compliant with other communication standards such as 3GSM, 3rd Generation Partnership Project (3GPP), Universal Mobile Telecommunication System (UMTS), 4G, etc. The above-noted technologies are used by example and are not exhaustive. The described embodiments do not depend on any particular characteristics or capabilities of the RAN.

The wireless transceivers may also comprise a wireless local area network (WLAN) transceiver 116 for communicating with a WLAN 150 via a WLAN access point (AP). The WLAN 150 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a short-range wireless transceiver, such as a Bluetooth® transceiver 118, for communicating with a computer 240. The mobile transceiver 102 may alternatively communicate with the computer 240 using a physical link such as the data port 122 (e.g., USB port). The Bluetooth transceiver 118 could be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

Data received by the mobile transceiver 102 may be decompressed and decrypted by a decoder (not shown). The communication subsystem of the mobile transceiver 102 also includes one or more antennas, a processor such as a digital signal processor (DSP), and local oscillators (LOs). The specific design and implementation of the communication subsystem is dependent upon the wireless communication technologies implemented by the mobile transceiver 102.

Network access requirements vary depending upon the type of cellular network 160. The mobile transceiver 102 includes a smart card interface 140 for receiving a smart card 142 for storing and reading data, such as subscriber identity data, by the processor 104. The smart card 142 may be a Subscriber Identity Module (SIM) card for use in a GSM network or other type of smart card for use in the relevant wireless network type which provides wireless network access. The smart card 142 may be a Universal Integrated Circuit Card (UICC) containing at least a SIM and a Universal Subscriber Identity Module (USIM) application. UICC is the smart card technology used in most contemporary GSM and UMTS networks. While a SIM card for a GSM network has been described as an example, the term smart card is intended to encompass all types of smart cards and other similar technology for providing a USIM, Removable User Identity Module (R-UIM) or CDMA Subscriber Identity Module (CSIM) or other similar technology used in UMTS and CDMA networks.

The mobile transceiver 102 also includes a battery 146 as a power source. The battery 146 may be a rechargeable or non-rechargeable battery. The battery 146 provides electrical power to at least some of the components of the mobile transceiver 102. A battery interface 144 provides a mechanical and electrical connection for the battery 146. The battery interface 144 may be coupled to a regulator (not shown) which provides power V+ to the circuitry of the mobile transceiver 102. In some embodiments, the battery 146 is a large-capacity, non-rechargeable, sealed battery which is expected to have a relatively long service life, such as 5-7 years of active service. It will be appreciated that the mobile transceiver 102 is intended for uninterrupted operation even though one or more components, such as the cellular transceiver 114, satellite receiver 120 and/or sensors 130 may be put into a low power mode periodically to conserve battery life.

An initialization date or similar date when the mobile transceiver 102 was first powered on, e.g. when the battery 146 is first installed, may be used to determine the date and time of the first power up. Due to the desire for uninterrupted operation, it is contemplated that the mobile transceiver 102 may lack a power button (on/off button) in some embodiments.

The mobile transceiver 102 may also include a power interface, such as a power port, for connecting to an external power source 152 such as an alternating current (AC) power adapter. The mobile transceiver 102 can use the external power source 152 rather than the battery 146. If the battery 146 is rechargeable, the external power source 152 may be used to recharge the battery 146.

Referring again to FIG. 1, an example communication system 100 in which a mobile transceiver 102 of the present disclosure can operate will be described. The mobile transceiver 102 typically uses the cellular network 160 to access an asset tracking service (or fleet management server) 200. The asset tracking service 200 may be implemented as one or more server modules and is typically located behind a firewall 210. The asset tracking service 200 provides administrative control and management capabilities over a plurality of managed mobile transceivers 102. The asset tracking service 200 may be embodied as a variety of configurations, in hardware or software, including a server-based system, an Application Programming Interface (API) and/or endpoint that provides access and abstraction of the functionality of asset tracking server 200 such that no hardware or configuration information is necessary to access the functionality other than the API location and functional definitions.

The asset tracking service 200 provides secure transmission of data exchanged between the asset tracking service 200 and the plurality of managed mobile transceivers 102. Communication between the asset tracking service 200 and the mobile transceivers 102 may be encrypted, for example, using Advanced Encryption Standard (AES) or Triple Data Encryption Standard (Triple DES) encryption.

The mobile transceiver 102 use signals received by the satellite receiver 120 from a plurality of satellites in the satellite network 180 to determine its position. For example, the mobile transceiver 102 may use the satellite receiver 120 to determine is location in response to an alarm. An alarm is a configurable wakeup event which causes the mobile transceiver 102, or a subsystem of the mobile transceiver 102 such as the satellite receiver 120 or one or more sensors 130, to wake up from a low power mode such as a sleep mode and perform configured actions (e.g., performs measurements of location and sensors) which are then logged and/or reported to the asset tracking service 200. The alarm may be a time-based alarm which the subsystem wakes up at regular intervals in accordance with a predefined schedule among other possibilities. The frequency or schedule at which the location is determined may be fixed or configurable. The mobile transceiver 102 stores the determined location, typically in terms of Latitude and Longitude, and a time at which the location was determined in a data log stored in the memory 112 of the mobile transceiver 102. Thus, the data log provides an asset tracking log.

As noted above, the mobile transceiver 102 may also use one or more of the sensors 130 to sense or measure an environment of the mobile transceiver 102 in response to an alarm. For example, the sensors 130 may be used to measure temperature, pressure and humidity, as well as door open or movement events, among other parameters. The sensor data acquired via the sensors 130 and a time at which the sensor data was acquired are also stored in the data log (i.e., the asset tracking log), which is stored in the memory 112. As with the location data, the mobile transceiver 102 may collect sensor data at regular intervals, in accordance with a predefined schedule, or in response to an alarm. The frequency or schedule at which sensor data is acquired may be fixed or configurable.

The mobile transceiver 102 attempts to connect to the asset tracking service 200 to report location and/or sensor data stored in the asset tracking log at regular intervals, in accordance with a predefined schedule, or in response to an alarm. The frequency or schedule at which the mobile transceiver 102 attempts to connect to the asset tracking service 200 may be fixed or configurable. The mobile transceiver 102 typically attempts to connect to the asset tracking service 200 using a wireless transceiver such as the cellular transceiver 114. The mobile transceiver 102 has access to multiple wireless services provided by multiple wireless transceivers, each of which provides access to one or more wireless services. In the described embodiment, the multiple wireless transceivers comprise the cellular transceiver 114, WLAN transceiver 116, and Bluetooth transceiver 118. The wireless transceivers may include multiple cellular transceivers 114 in some embodiments, which may be multi-band cellular transceivers 114. The mobile transceiver 102 could also attempt to connect to the asset tracking service 200 using a physical link, either directly or indirectly via the computer 240. Each wireless service supported by the mobile transceiver 102 may be defined by a standard or specification. Non-limiting examples of wireless service described elsewhere in the present disclosure and include 4G Long-Term Evolution (LTE), 3G and 2G, WLAN and Bluetooth.

When the mobile transceiver 102 connects to the cellular network 160, WLAN 150, or computer 240 via Bluetooth and/or USB, the mobile transceiver 102 can send the data log or a portion of the data log (i.e., an unreported portion of the data log) to the asset tracking service 200 through the firewall 210 using a communication network 230. The data log information may be sent using any suitable message format including, for example, a proprietary message format. The mobile transceiver 102 data log typically includes an indicator regarding which data in the data log has been reported and which data in the data log is unreported. For example, in some embodiments, the data log comprises a series of records including and identified by a record identifier (ID). Each record also includes a time at which the record was made, location data and/or sensor data, and a report status indicating whether the record has been reported to the asset tracking service 200. After an unreported record is reported to the asset tracking service 200, its corresponding report status field in the data log is updated.

The mobile transceiver 102 powers-down certain device components when not in use to conserve battery power. For example, the mobile transceiver 102 initiates a low power mode for the cellular transceiver 114 after a reporting time/cycle. The low power mode may be an off mode (also known as an off state) in which the cellular transceiver 114 is unpowered or a sleep mode (also known as a standby mode or suspended operation mode) with low power consumption. The cellular transceiver 114 is then activated from the low power mode at the next reporting time/cycle. Any other wireless transceivers are similarly placed into a low power mode after a reporting time/cycle. The satellite receiver 120 and sensors 130 may also be placed into a low power mode when not obtaining location or sensor data, and then activated from the low power mode at the next measurement time/cycle.

The data logging and data reporting cycles are typically different and do not coincide, although the cycles may overlap to varying degrees. For example, each reporting cycle typically involves reporting several records of the data log each including location data and/or sensor data. The cycles may overlap in that location data and/or sensor data may be captured as part of a common process at some times or may be captured as part of a separate process performed just prior to reporting logged data to the asset tracking service 200. For example, a wireless transceiver may be awaken for reporting at the same time, or just after, the satellite receiver 120 and/or sensors 130 are awaken and location data and/or sensor data is captured.

The communication system 100 is provided for the purpose of illustration only. The communication system 100 is but one possible configuration of a multitude of possible communication network configurations for use with the mobile transceiver 102. Suitable variations will be understood to a person of skill in the art and are intended to fall within the scope of the present disclosure. For example, while individual networks have been represented for convenience, it will be appreciated that multiple networks of each type and intermediate networks connected to the shown networks may be provided. Also, the communication links represented in FIG. 1 can be implemented using public and/or private networks that can communicate using packet data technologies, such as X.25 or Internet Protocol (IP) based addressing and routing techniques. Some connections can be implemented as secure connections, for example, using Virtual Private Network (VPN) technologies.

Figure 3:
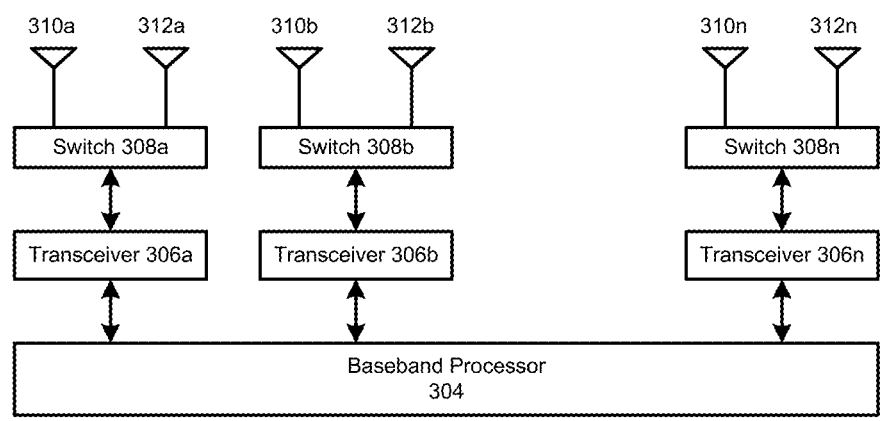
FIG. 3 is a block diagram illustrating a wireless communication subsystem in accordance with an example embodiment of the present disclosure.

Referring now to FIG. 3, a wireless communication subsystem 300 in accordance with an example embodiment of the present disclosure will be described. The wireless communication subsystem 300 includes a digital baseband processor 304 which manages functions that require an antenna, and a plurality of wireless transceivers and/or receivers 306, represented individually by references 306a, 306b, . . . 306n. Each of the wireless transceivers/receivers 306 is coupled to a switch 308, represented individually by references 308a, 308b, . . . 308n, which is coupled to an internal antenna 310, represented individually by references 310a, 310b, . . . 310n, and an external antenna 312, represented individually by references 312a, 312b, . . . 312n. The external antennas 312 typically serve as the primary antennas because of the reduced RF interference associated with being located outside of the shipping container 400, whereas the internal antennas 310 typically serve as secondary antennas because of the increased RF interference associated with being located inside of the shipping container 400.

It at least some embodiments, the external antennas 312 are provided in a common external antenna module, and a ground pin of the external antenna module is connected to a general-purpose input/output (GPIO) pin of the processor 104 which can be monitored, for example, when the mobile transceiver 102 wakes up. When the ground pin of the external antenna module is not detected, this is an indication that the external antenna module is disconnected, an electronic malfunction has occurred in the external antenna module, or the external antenna 312 and/or the external housing module 504 has been otherwise damaged or tampered with. In other embodiments, a ground pin of each external antenna 312 may be individually connected to a GPIO pin of the processor 104.

As noted above, the wireless transceivers/receivers 306 include at least one cellular transceiver 114 such as a multi-band cellular transceiver that supports multiple radio frequency bands which may include, for example, multiple 4G Long-Term Evolution (LTE) or LTE Advanced bands as well as global 3G and 2G bands and at least one satellite receiver 120.

While a common baseband processor 304 for the cellular transceiver 114 and satellite receiver 120 has been described, in other embodiments a separate baseband processor could be provided for the satellite receiver 120 and the cellular transceiver 114. In the wireless communication subsystem 300, the cellular transceiver 114 and satellite receiver 120 are individually switched and capable of operating independently. Consequently, the satellite receiver 120 can use an external antenna 312 while the cellular transceiver 114 uses an internal antenna 310, or vice versa, the satellite receiver 120 and the cellular transceiver 114 can both use an external antennas 312, or the satellite receiver 120 and the cellular transceiver 114 can both use an internal antennas 30. The baseband processor 304, or main processor 104, selects either the internal antenna 310 or external antenna 312 for the satellite receiver 120 and the cellular transceiver 114 depending on factors such as signal quality and ancillary information from the sensors 130. Each of the wireless transceivers/receivers 306 (e.g., the satellite receiver 120 and the cellular transceiver 114) may also be separately powered-on, powered-off or placed into a sleep mode.

While not shown, each of the wireless transceivers/receivers 306 has an RF front end circuit (also known as a transceiver module/receiver module) which generally includes all components between the antennas and the digital baseband processor 304. For example, the RF front end circuit of a cellular transceiver includes a receiver, a transmitter, and local oscillators (LOs). The receiver performs common receiver functions as signal amplification, frequency down conversion, filtering, channel selection, etc., as well as analog-to-digital conversion (ADC). The ADC of a received signal allows more complex communication functions such as demodulation and decoding to be performed by the digital baseband processor 304. In a similar manner, signals to be transmitted are processed, including modulation and encoding, for example, by the digital baseband processor 304. The processed signals are input to the transmitter for digital-to-analog conversion (DAC), frequency up conversion, filtering, amplification, and transmission via the antennas. A receiver, lacking transmitting functions, typically omits components required for receiving.

The mobile transceiver 102 is intended to be attached to, or incorporated in, a moveable asset to track its location using a satellite receiver 120 as well as sensing or measuring other conditions, such as temperature, humidity, general operating conditions, average speed, maximum speed, content status, door open or closed condition, etc. using the sensors 130. The asset tracked by the mobile transceiver 102 may be a shipping container, truck, rail car, automobile, etc. Tracking requirements for tracking assets may vary depending on the mode of transportation (e.g., ship, rail, car, and possibly air). For example, if the mobile transceiver 102 is attached to an asset that is being moved by rail, the logging and/or reporting may be at longer intervals than if the asset was being moved by truck through town streets. Also, different sensors 130 may be monitored depending on the mode of transportation. For example, there may be no need to check for door open or close status while mobile transceiver 102 is being moved by ship.

The mobile transceiver 102 has a device configuration which defines alarms (e.g., wakeup or trigger events) which wake up the mobile transceiver 102 from an inactive mode (e.g., sleep mode) to determine the device status, including location and/or environmental conditions at a particular time, and report the device status to the asset tracking service 200. The alarms events may be scheduled events, for example based on a time of day or frequency, or unscheduled events which asynchronously wake up the mobile transceiver 102 to report the device status. The mobile transceiver 102 is in a sleep mode much of the time to conserve power and wakes up in response to alarms. For example, the mobile transceiver 102 may wake up only at predetermined time intervals or due to detections or measurements by the sensors 130. When the mobile transceiver 102 wakes up from sleep mode, the mobile transceiver 102 typically determines its location using the satellite receiver 120 and/or measures one or more environmental conditions using one or more of the sensors 130, stores the measured data in a data log in memory 112, and then reports the device status to the asset tracking service 200, for example, by sending at least a portion of a data log to the asset tracking service 200 over the Internet via the cellular transceiver 114. For example, the mobile transceiver 102 may wake up every hour to determine and report the device status, or the mobile transceiver 102 may wake up when a door of the shipping container to which it is attached is opened. When the mobile transceiver 102 wakes up, the mobile transceiver 102 may determine the reason for the alarm. The mobile transceiver 102 may then determine its location using the satellite receiver 120 and/or measure one or more environmental conditions based on the alarm type. The mobile transceiver 102 may then transmit the measured data to the asset tracking service 200. The mobile transceiver 102 then goes back to into the sleep mode until it wakes up in response to another alarm.

Each alarm is defined by a number of parameters that includes an identifier (ID) such as a unique number to identify the alarm, an alarm type that identifies a type of the alarm, one or more condition parameters to be satisfied for the alarm to be triggered, and one or more actions to take when the alarm is triggered. The alarm types are typically based on either time or sensor data. There are two sub-types of time-based alarms. The first type of timed based alarm is frequency which specifies a frequency at which data is to be measured, the condition parameters for the alarm checked and reported to the asset tracking service 200. An example value for the frequency alarm is every 15 minutes. The second type of time based alarm is time (or date) which specifies a time and/or date at which the condition parameters for the alarm are checked. An example value for the frequency alarm is 12:00 PM every day. The sensor-based alarms are defined based on the capabilities of the mobile transceiver 102, i.e. the onboard sensors 130. The sensor-based alarms may include temperature, humidity, pressure, movement detection, location, location within or with respect to a specific geo-fence, door open or closed condition, etc. The alarm types may also be based on other factors such as location or location history. A geo-fence is a virtual perimeter defined by a particular geographic area using geo-spatial coordinates, such as Latitude and Longitude, used by the satellite receiver 120. A geo-fence may be fixed or dynamically generated, for example, a radius around a particular point location. The geo-fence may be a predefined set of boundaries, or may be a set of zones or areas which need not be adjacent. The alarm actions may include the type of sensor data to measure and transmit to the asset tracking service 200 and possibly other things like running diagnostics, changing device state, location data, etc.

Method of Dynamic Adaptive Monitoring and Reporting

In tracking applications, such as global and long-range tracking applications, the asset being tracked may travel along well-established long-distance routes over land, water and possibly air. For example, with North America it is not uncommon for a truck to originate in Mexico and travel through the USA to Canada. Similarly, a shipping container may originate in mainland China and travel around South Africa with a final destination in North America.

A travel itinerary for the asset being tracked and the mobile transceiver 102 is provided by a user, such as a shipping company, who knows the intended route. The travel itinerary defines a number of waypoints including at least an origin endpoint, destination endpoint, and possibly intermediate waypoints along the intended route. Each waypoint corresponds to a location or geographical area along the intended route. The travel itinerary may be entered or otherwise provided to the asset tracking service 200 by the user. To improve power and processing resource conservation, the asset tracking service 200 determines and pre-programs one or more wakeup events in which the mobile transceiver 102 powers-up from a low power mode after a period of inactivity according to waypoints defined by the travel itinerary. The wakeup events may be time-based to regularly wakeup the mobile transceiver 102 at predetermined intervals and/or predetermined frequencies at which the mobile transceiver 102 may determine its location and/or senses environmental conditions using the sensors 130 and optionally report location and/or sensor data to the asset tracking service 200. The travel itinerary also includes a wakeup frequency and optionally a type of environment and/or a location technology to be used for determining location. An example travel itinerary is provided below in Table 1.

TABLE 1

Example travel itinerary

| Event | Waypoint | Environment | Location Technology | Wakeup frequency |
|---|---|---|---|---|
| 1 | Origin | Suburban | GNSS/Wi-Fi | Medium frequency |
| ... | In transit | Rural | GNSS only | Low frequency |
| n-1 | In transit | Rural | GNSS only | Low frequency |
| N | Destination | Urban | GNSS/Wi-Fi/Cellular | High frequency |

In the example travel itinerary in Table 1, the travel itinerary includes a number of wakeup events each including a number of parameters including, a wakeup event identifier or descriptor, a waypoint descriptor, an environment, a location technology, and a wakeup frequency. While not shown in Table 1, the travel itinerary may also include, for example, an expected time at the various waypoints based on a mode of transportation in other embodiments.

Depending on the embodiment, the wakeup frequency may be a reporting frequency, a measuring (or acquisition) frequency, or both. Alternatively, a distinct reporting frequency and measuring frequency may be defined. A reporting frequency specifies a frequency of reporting location and/or sensor data acquired by the mobile transceiver 102. A measuring frequency specifies a frequency at which location and/or sensor data is acquired. In order words, the reporting frequency is a frequency at which data reporting events are performed and the measuring frequency is a frequency at which data logging events, such as location fixes and/or sensor data acquisitions, are performed. Further, it will be appreciated that the frequency at which location fixes are performed (i.e., when location data is acquired) and the frequency at which sensor data is acquired from the sensors may be different. Similarly, each of the sensors 130 may have its own measuring frequency or none at all. Furthermore, the travel itinerary may specify the available wireless coverage for the waypoint and/or particular geographic location and/or a preferred wireless carrier in other embodiments.

The travel itinerary is provided to the mobile transceiver 102 by the asset tracking service 200. For example, the travel itinerary may be downloaded onto the mobile transceiver 102 from the asset tracking service 200 at or before the beginning of a trip. The asset tracking service 200 also sends instructions/command to the mobile transceiver 102 which configure time-based wakeup events on the mobile transceiver 102 which wake up the mobile transceiver 102 from a low power mode at predetermined times and/or predetermined frequencies. If there is no wireless (cellular) coverage while in transit, the mobile transceiver 102 may be configured not to activate the cellular transceiver 114, thereby conserving computing and power resources. In a long-range application in which the mobile transceiver 102 may be out of wireless coverage for an extended period of time, one or more pre-programmed wakeup events at intervals along the route may also be provided for data logging only using other means such as, for example, the satellite receiver 120 to obtain a location fix and/or sensors 130 to obtain environmental data.

The waypoint descriptors indicate a name or description of the waypoint. The shown waypoint descriptors are Origin, In Transit, and Destination in the shown example. However, more detailed waypoints and waypoint descriptors may be provided in other embodiments including, for example, "Rail", "Ship", "Street", "Dock", "Home", "Warehouse", "Distribution Centre", "Outside", "Inside", or the particular geographic location. Alternatively, the particular geographic location for each waypoint may be provided in addition to, and separate from, the waypoint descriptor. The particular geographic location may be a city name, country or region (e.g. Asia Pacific, Europe, the Middle East and Africa (EMEA), North America, South America, etc.).

The environment parameter indicates a type of environment. In the shown example, the type of environment is one of urban, suburban or rural. The environment types of urban, suburban and rural represent high-density, medium-density and low-density areas, respectively. In other embodiments, the type of environment may be one of high-density, medium-density or low-density, in which density reflects population and/or physical infrastructure (e.g., roads, buildings). Other environment types may be used in other embodiments.

The location technology parameter indicates a type of location determining technology to be used for determining the location of the mobile transceiver 102. The location technology may be GNSS such as GPS (e.g., using the satellite receiver 120) only, GNSS augmented by one or more alternate location technologies, or alternate location technology only as an alternative to GNSS. Alternate location technologies are useful in locations in which GNSS may be inadequate such due to issues including multipath effects in which radio signals reflect off surroundings such as buildings, canyon walls, hard ground, etc. and indoor signal blockage, among other potential causes. Thus, alternate location technologies may include indoor positioning systems. Alternate location technologies may include one or more of a cellular positioning system or a Wi-Fi-based positioning system (WFPS), among other possibilities. The cellular positioning system typically performs localization using multilateration, trilateration, or triangulation of radio signals between several radio towers of the RAN.

WFPS localization techniques include received signal strength indication ("RSSI") localization techniques, RSSI fingerprinting techniques, Angle-of-Arrival (AoA) based techniques, and ToF-based techniques. Each Wi-Fi access point is identified using the service set identifier (SSID) and media access control address (MAC address) of the Wi-Fi access point. With RSSI location techniques, RSSI from the mobile transceiver 102 to several different Wi-Fi access points are measured and a propagation model is used to determine the distance between the mobile transceiver 102 and the different Wi-Fi access points, for example, using multilateration, trilateration, or triangulation techniques. In RSSI fingerprinting techniques, a database of RSSI measurements from several different Wi-Fi access points along with the coordinates of the mobile transceiver 102 are used. With AoA based techniques, using Wi-Fi access points having multiple antennas and multiple-input and multiple-output (MIMO) Wi-Fi interfaces, the AoA of the multipath signals received at the antenna arrays in the Wi-Fi access points can be estimated. From this estimate, triangulation techniques can be used to calculate the location of the mobile transceiver 102. With ToF-based techniques use timestamps provided by the wireless interfaces of the mobile transceiver 102 and Wi-Fi access points to calculate the ToF of signals and then use this information to estimate the distance and relative position of the mobile transceiver 102 with respect to the Wi-Fi access points.

The wakeup frequency is shown in Table 1 as being one of low frequency, medium frequency or high frequency. While three different reporting frequencies are described, a greater or fewer number of reporting frequencies may be provided in other embodiments. In addition, the described reporting frequencies are qualitative and the mobile transceiver 102 may include a mapping between these qualitative reporting frequencies and quantitative reporting frequencies, such as an internal specified in minutes. Alternatively, the reporting frequencies may be specified in quantitative terms in other embodiments, e.g., 5 minutes, 10 minutes, 15 minutes or 30 minutes.

While the travel itinerary has being described has including certain data items and having a certain data structure, the present disclosure is not intended to be limited to the described data structure. Any data structure in which the described data items are provided and associated with each other may be used, whether those data items are stored in a travel itinerary or elsewhere.

The mobile transceiver 102 may change the frequency based on the present waypoint or next waypoint. For example, the mobile transceiver 102 may change the wakeup frequency when it approaches the destination endpoint specified in the travel itinerary. In some embodiments, the mobile transceiver 102 may increase reporting frequency when it approaches the destination endpoint to provide a more accurate estimated time of arrival to the asset tracking service 200. The increase may occur at a particular waypoint prior to the destination endpoint or a predetermined number of waypoints prior to the destination endpoint, among other possibilities. The increase may be performed periodically and progressively as the mobile transceiver 102 approaches the destination endpoint. For example, after the increase has commenced, the wakeup frequency may increase after each waypoint or after a particular number of waypoints (e.g., every 2 or 3 waypoints).

For another example, the mobile transceiver 102 may change the wakeup frequency based on the type of environment being traversed. In some embodiments, the mobile transceiver 102 may increase the wakeup frequency when the mobile transceiver 102 is in higher-density areas to provide a finer granularity in position when the mobile transceiver 102 is in densely populated areas, such as urban areas. A low frequency (e.g., 30 minutes) may be used in low-density areas (e.g., rural areas), a medium frequency (e.g., 10-15 minutes) may be used in medium-density areas (e.g., suburban areas) and a high frequency (e.g., 1-5 minutes) may be used in high-density areas.

The mobile transceiver 102 may change the frequency based on a distance of the mobile transceiver 102 from the associated waypoint and/or a distance from the intended route. For example, the frequency may increase when the mobile transceiver 102 is determined to be more than a threshold distance from the associated waypoint and/or intended route (after a location fix has been obtained). The increase may be progressive based on the determined distance from the associated waypoint and/or intended route. For example, the frequency may increase in stepped fashion based on the threshold distance. Conversely, the frequency may decrease when the mobile transceiver 102 is determined to be less than a threshold distance from the associated waypoint and/or intended route, for example, when the frequency was previously increased when the mobile transceiver 102 is determined to be more than a threshold distance from the associated waypoint and/or intended route. The decrease may be progressive based on the determined distance from the associated waypoint and/or intended route. For example, the frequency may decrease in stepped fashion based on the threshold distance. In other embodiments, the frequency may be dependent on, possibly proportional to, a distance of the mobile transceiver 102 from the associated waypoint and/or a distance from the intended route. The wakeup frequency of the one or more subsequent wakeup events may be decreased or increase based on a distance from the determined waypoint and/or an intended route.

The mobile transceiver 102 may group a series of data acquisitions (e.g., location fixes and/or sensor data) for reporting to the asset tracking service 200 at a later time. For example, location fixes may be acquired at five minute intervals but may be reported together at fifteen minute intervals. The group of data acquisitions may occur instead, or in addition to, changing the reporting frequency. Conversely, to increase accuracy as the mobile transceiver 102 approaches a densely populated area, a fifteen minute reporting interval may be increased to change to three location fixes at five-minute intervals.

The mobile transceiver 102 may change the measuring frequency based on the present waypoint or next waypoint in a similar manner to how reporting frequency is changed. In some embodiments, the measuring frequency may be increased in response to one of the triggers described above (e.g., change in environment type, change in distance from associated waypoint and/or intended route, etc.) while the reporting frequency remains unchanged as described above.

Figure 4:
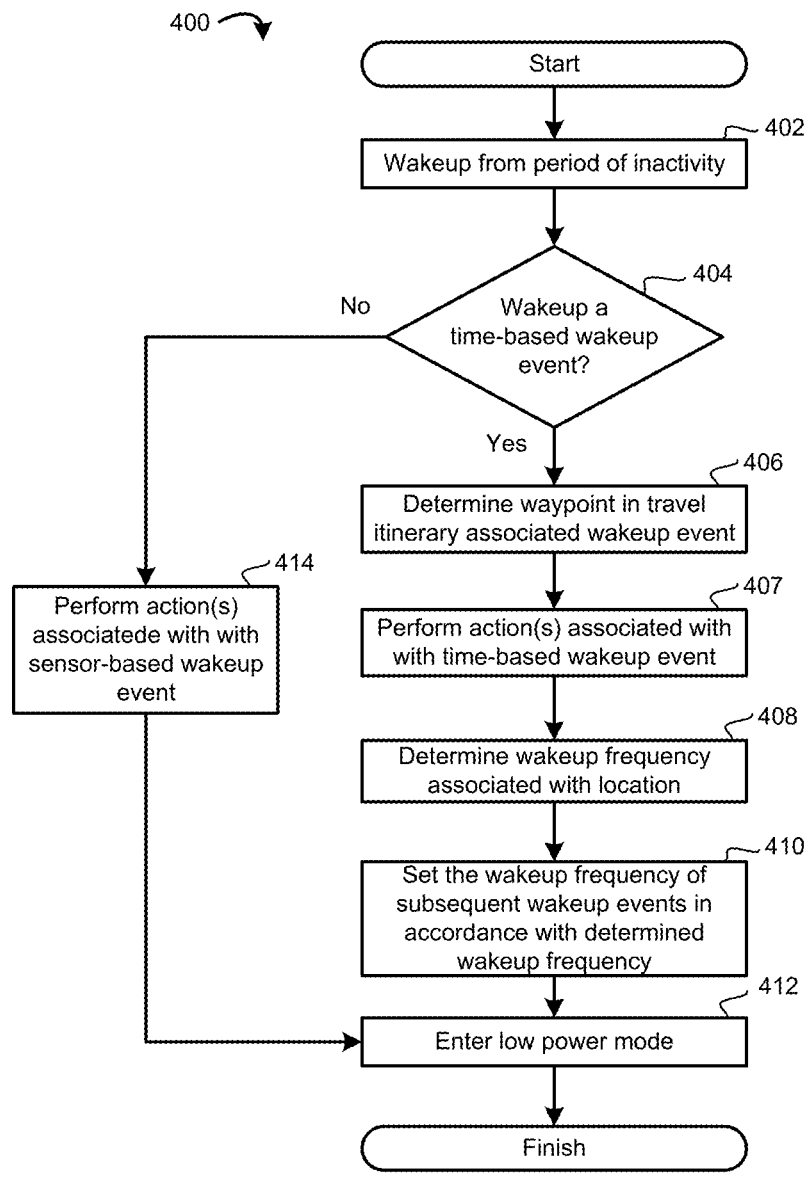
FIG. 4 is a flowchart illustrating a method of operating a mobile transceiver in accordance with one embodiment of the present disclosure.

FIG. 4 illustrates a flowchart of a method 400 of operating a mobile transceiver 102 such as a GNSS tracking device in accordance with one example embodiment of the present disclosure. The method may be carried out by software executed by a processor of the mobile transceiver 102. Coding of software for carrying out such a method 400 is within the scope of a person of ordinary skill in the art provided the present disclosure. The method 400 may contain additional or fewer processes than shown and/or described, and may be performed in a different order in other embodiments. Machine readable code executable by the processor to perform the method 400 may be stored in a machine readable medium such as a memory of the mobile transceiver 102.

At 402, the mobile transceiver 102 wakes up from a low power mode after a period of inactivity. For example, the mobile transceiver 102 may wake up from a sleep mode in response to a wakeup event (also described herein as an alarm).

At 404, the mobile transceiver 102 determines whether the wakeup event corresponds to a time-based wakeup event. When the wakeup event does not correspond to a time-based wakeup event, the wakeup event corresponds to a sensor-based alarm and the operations proceed to 414 at which the mobile transceiver 102 performs one or more actions associated with the sensor-based wakeup event. The one or more actions may comprise data logging, data reporting or both depending on the embodiment. Data logging comprises acquiring location data and/or sensor data via one or more sensors, storing the acquired location data and/or sensor data in a data log in a memory of the mobile transceiver 102. Data reporting comprises sending at least a portion of the data log to the asset tracking service 200. Data reporting is typically performed after data logging. However, data reporting may consist of sending at least a portion of the data log to the asset tracking service 200 without performing data logging or acquisition prior to the reporting.

In some embodiments, the wakeup event may be a data logging event in which location and/or sensor data is acquired and stored in a data log in a memory of the mobile transceiver 102 but not reported or a data reporting event in which at least a portion of the data log is reported to the asset tracking service 200. Data reporting events are typically performed after data logging events.

When the wakeup event corresponds to a time-based wakeup event, the operations proceed to 406 at which the mobile transceiver 102 determines a waypoint in the travel itinerary corresponding to the wakeup event. The waypoint may be determined by correlating the pre-programmed wakeup event to a waypoint in the travel itinerary. Each wakeup event may be identified by a wakeup event ID or a time at which the wakeup event occurred, among other possibilities.

At 407, the mobile transceiver 102 performs one or more actions associated with the time-based wakeup event. As with the actions of sensor-based alarms, the one or more actions comprise data logging, data reporting or both.

When the one or more actions comprise determining a location of the mobile transceiver 102, in some embodiments the mobile transceiver 102 may determine one or more location technologies associated with the waypoint corresponding to the wakeup event, and then determine the location of the mobile transceiver 102 using the determined one or more location technologies associated with the waypoint. The location technologies are one of GNSS only, GNSS augmented with alternate location technologies, or alternate location technologies only. The alternate location technologies include one or more of a cellular positioning system or a Wi-Fi-based positioning system. In some embodiments, the alternate location technologies may be used whenever alternate location technologies is available, for example, to either augment GNSS or provide location services when GNSS is not available (for example, because the asset is indoors or the satellite signal is blocked).

At 408, the mobile transceiver 102 determines a wakeup frequency associated with the determined waypoint.

In some embodiments, the mobile transceiver 102 determines whether the determined waypoint is within a threshold of the destination endpoint, and increases the wakeup frequency of the one or more subsequent wakeup events when the determined waypoint is determined to be within a threshold of the destination endpoint. The wakeup frequency of the one or more subsequent wakeup events may be periodically increased after the determined waypoint is determined to be within a threshold of the destination endpoint, as described above.

In some embodiments, the wakeup frequency of the one or more subsequent wakeup events is increased when the determined waypoint is associated with an environment having a higher density than a previous waypoint. Conversely, the wakeup frequency of the one or more subsequent wakeup events is decreased when the determined waypoint is associated with an environment having a lower density than a previous waypoint.

In some embodiments, the wakeup frequency of the one or more subsequent wakeup events is a high frequency when the determined waypoint is associated with a high-density environment, a medium frequency when the determined waypoint is associated with a medium-density environment, and a low frequency when the determined waypoint is associated with a low-density environment. In other embodiments, the wakeup frequency of the one or more subsequent wakeup events is a high frequency when the determined waypoint is associated with an urban environment, a medium frequency when the determined waypoint is associated with a suburban environment, and a low frequency when the determined waypoint is associated with a rural environment.

The wakeup event may be a reporting frequency or a measuring frequency in embodiments in which the wakeup event may be a data logging event or a data reporting event. A measuring frequency is a frequency at which data logging events are performed. A reporting frequency is a frequency at which the data logging events are performed. When distinct data logging events and data reporting events are performed, determining the frequency associated with the determined waypoint comprises determining a measuring frequency and a reporting frequency associated with the determined waypoint. In some embodiments, the measuring frequency may be greater than the reporting frequency so that multiple data logging events are reported in each data reporting event. For example, the reporting frequency may be a multiple (e.g., integer) of the measuring frequency so that multiple data logging events are reported in each data reporting event. In some embodiments, when distinct data logging events and data reporting events are performed, the measuring frequency may be increased while the reporting frequency is unchanged.

At 410, the mobile transceiver 102 sets the wakeup frequency of one or more subsequent wakeup events (such as a next wakeup event) in accordance with the determined wakeup frequency. When distinct data logging events and data reporting events are performed, the frequency of data logging events is set in accordance with a determined measuring frequency associated with the determined waypoint, and the frequency of data reporting events is set in accordance with a determined reporting frequency associated with the determined waypoint.

At 412, the mobile transceiver 102 initializes a low power mode until the next wakeup event/alarm (e.g., data logging and/or data reporting event). The low power mode may affect the processor 104, cellular transceiver 114, satellite receiver 120 and sensors 130 until the next alarm (e.g., logging and/or reporting cycle). In addition to the cellular transceiver 114 and/or satellite receiver 120, one or both of the processor 104 and sensors 130 may enter a low power mode.

Figure 5:
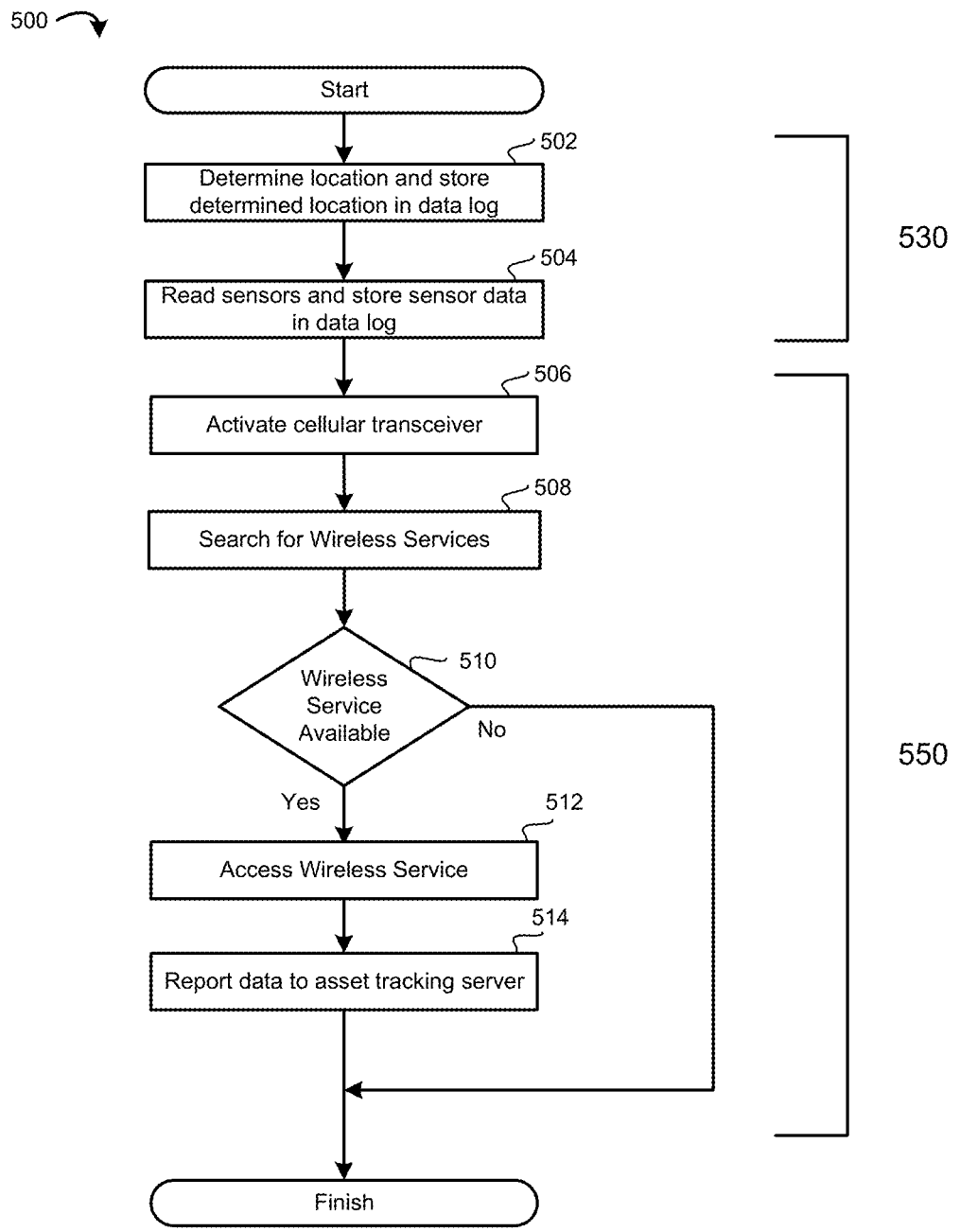
FIG. 5 is a flowchart illustrating a method of performing data logging and/or data reporting actions associated with a determined waypoint in accordance with one embodiment of the present disclosure.

FIG. 5 illustrates a flowchart of a method 500 of performing data logging and/or data reporting actions associated with a determined waypoint in accordance with one example embodiment of the present disclosure. The method 500 may be carried out by software executed by a processor of the mobile transceiver 102. Coding of software for carrying out such a method 500 is within the scope of a person of ordinary skill in the art provided the present disclosure. The method 500 may contain additional or fewer processes than shown and/or described, and may be performed in a different order in other embodiments. Machine readable code executable by the processor to perform the method 500 may be stored in a machine readable medium such as a memory of the mobile transceiver 102.

The method 500 includes both data logging actions represented by reference 530 and data reporting actions represented by reference 550. In other embodiments, only one of the data logging actions 530 or data reporting actions 550 may be performed.

At 502, the mobile transceiver 102 determines its location. The location may be determined by the satellite receiver 120, an alternate location technology described above, or the satellite receiver 120 augmented by one or more alternate location technologies depending on the embodiment and/or whether an alternate location technology is available at the particular waypoint. The mobile transceiver 102 may select the location technology to use based on the available location technology at the particular waypoint and the capabilities of the mobile transceiver 102. The mobile transceiver 102 may also store the available alternate location technology along the route in association with the respective waypoints for subsequent use in selecting the location technology to be used in determining its location. The determined location and a time associated with the determined location are stored in the data log in the memory of the mobile transceiver 102.

At 504, the mobile transceiver 102 senses, via one or more sensors 130, an environment of the mobile transceiver 120. The sensor data acquired via the one or more sensors and a time at which the sensor data was acquired is stored in the data log in the memory of the mobile transceiver 102.

At 506, the mobile transceiver 102 activates the cellular transceiver 114 from a low power mode.

At 508, the cellular transceiver 114 searches for wireless services. The cellular transceiver 114 may search for an available wireless signal based on a preferred wireless carrier from a list of available carriers or a list of supported wireless services. For example, when the wireless transceivers comprises a multi-band cellular transceiver 114 supporting 4G LTE, 3G and 2G is carried by the mobile transceiver 102, the cellular transceiver 114 may search (e.g., scans) for cellular data services such as 4G LTE, 3G and 2G.

At 510, the mobile transceiver 102 determines whether wireless services are available based on whether any response to the scans are received, for example, from base stations or nodes in a cellular network 160. When a wireless service is not available, operations end.

When a wireless service is available, operations proceed to 512 at which the mobile transceiver 102 accesses, or connects to, a wireless service from the available wireless services.

At 514, the mobile transceiver 102 reports, via the cellular transceiver, measured and/or logged data to the asset tracking service 200. The data may include a determined location and/or sensed data acquired via the one or more sensors 130, depending on the embodiment. In embodiments in which the data reporting follows data logging, the mobile transceiver 102 sends at least a portion of the data log to the asset tracking service 200 using the wireless service. The data log includes a plurality of determined locations and associated times at which the locations were determined and/or a plurality of sensor data acquisitions and associated times at which the sensor data was acquired.

The above-described methods provide global and long-range tracking methods that dynamically adapts location and/or sensor monitoring and reporting based on the geographic area in which the mobile transceiver 102 is located. The above-described methods are particularly advantageous when the mobile transceiver 102 is provided with a non-rechargeable battery. Conventionally, a tracking device powers up regularly at a pre-determined interval, to acquire a GPS location fix, and report location. The above-described methods obviate the need to repeatedly power up the satellite receiver along a well-established long-distance route only to yield lat/long coordinates with little variance from the route, thereby avoiding many large current-drain penalties which would otherwise significantly degrade the expected life of the battery. The above-described methods also adapt to the environment in which the mobile transceiver 102 is located by performing data logging (e.g. location fixes) and data reporting less frequently in rural or low-density environments and by performing data logging and data reporting more frequently in urban or high-density environments. The above-described methods also increase data logging and data reporting frequency as it approaches its destination, where a more accurate estimated time of arrival is desired.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of operating a mobile transceiver, comprising:
    waking up the mobile transceiver from a low power mode in response to a wakeup event;
    determining a waypoint in a pre-programmed travel itinerary corresponding to the wakeup event, the travel itinerary being stored in a memory of the mobile transceiver and defining a number of waypoints along a planned route and a wakeup frequency for each of the waypoints, wherein each of the waypoints define a location, and wherein the waypoints include an origin endpoint, a destination endpoint and intermediate locations between the origin endpoint and destination endpoint; and
    setting one or more subsequent wakeup events based one or a combination of a time of the wakeup event, sensor data at the time of the wakeup event, and the determined waypoint.

2. The method of claim 1, wherein the waypoint in the pre-programmed travel itinerary corresponding to the wakeup event is determined in accordance with a location of the mobile transceiver at the time of the wakeup event.

3. The method of claim 1, wherein the waypoint in the pre-programmed travel itinerary corresponding to the wakeup event is determined in accordance with the time of the wakeup event.

4. The method of claim 1, wherein the one or more subsequent wakeup events are set based on a wakeup frequency defined by the travel itinerary for the determined waypoint.

5. The method of claim 4, wherein the wakeup frequency is higher when the determined waypoint is within a threshold distance of the destination endpoint.

6. The method of claim 4, wherein the wakeup frequency periodically increases after the determined waypoint is determined to be within a threshold distance of the destination endpoint.

7. The method of claim 4, wherein the wakeup frequency increases when the mobile transceiver is determined to be more than a threshold distance from the determined waypoint and/or the planned route.

8. The method of claim 4, wherein the wakeup frequency increases when the determined waypoint is associated with an environment having a higher density than a previous waypoint.

9. The method of claim 4, wherein the wakeup frequency decreases when the determined waypoint is associated with an environment having a lower density than a previous waypoint.

10. The method of claim 4, wherein the wakeup frequency is a high frequency when the determined waypoint is associated with a high-density environment, a medium frequency when the determined waypoint is associated with a medium-density environment, and a low frequency when the determined waypoint is associated with a low-density environment.

11. The method of claim 4, wherein the wakeup frequency is a high frequency when the determined waypoint is associated with an urban environment, a medium frequency when the determined waypoint is associated with a suburban environment, and a low frequency when the determined waypoint is associated with a rural environment.

12. The method of claim 1, wherein at least one of the one or more subsequent wakeup events are data logging events in which location and/or sensor data is acquired and stored in a data log in a memory of the mobile transceiver but not reported, and at least some of the one or more subsequent wakeup events are data reporting events in which at least a portion of the data log is reported to an asset tracking service,
wherein the data logging events have a measuring frequency at which the data logging events are performed, and the data reporting events have a reporting frequency at which the data logging events are reported,
wherein determining a frequency associated with the determined waypoint comprising determining a measuring frequency and a reporting frequency associated with the determined waypoint,
wherein the frequency of data logging events is set in accordance with a determined measuring frequency associated with the determined waypoint, and
wherein the frequency of data reporting events is set in accordance with a determined reporting frequency associated with the determined waypoint.

13. The method of claim 12, wherein the measuring frequency is increased in response to a trigger while the reporting frequency remains unchanged.

14. The method of claim 12, wherein the measuring frequency is greater than the reporting frequency so that multiple data logging events are reported in each data reporting event.

15. The method of claim 1, further comprising:
performing an action associated with the wakeup event.

16. The method of claim 15, wherein the action comprises determining a location of the mobile transceiver.

17. The method of claim 16, wherein the location of the mobile transceiver is determined using one or more location technologies associated with the waypoint, wherein the location technologies are one of GNSS only, GNSS augmented with alternate location technologies, or alternate location technologies only, wherein the alternate location technologies include one or more of a cellular positioning system or a Wi-Fi-based positioning system (WFPS).

18. The method of claim 15, wherein the action comprises one or both of data logging and data reporting.

19. A mobile transceiver, comprising:
a processor;
a memory coupled to the processor;
a satellite receiver coupled to the processor; and
a cellular transceiver coupled to the processor;
wherein the mobile transceiver is configured for:
waking up the mobile transceiver from a low power mode in response to a wakeup event;
determining a waypoint in a pre-programmed travel itinerary corresponding to the wakeup event, the travel itinerary being stored in a memory of the mobile transceiver and defining a number of waypoints along a planned route and a wakeup frequency for each of the waypoints, wherein each of the waypoints define a location, and wherein the waypoints include an origin endpoint, a destination endpoint and intermediate locations between the origin endpoint and destination endpoint; and
setting one or more subsequent wakeup events based one or a combination of a time of the wakeup event, sensor data at the time of the wakeup event, and the determined waypoint.

20. A non-transitory machine readable medium having tangibly stored thereon executable instructions that, when executed by a processor of a mobile transceiver, the mobile transceiver comprising a processor, a memory, a satellite receiver, and at least one wireless transceiver, cause the mobile transceiver to:
wake up the mobile transceiver from a low power mode in response to a wakeup event;
determine a waypoint in a pre-programmed travel itinerary corresponding to the wakeup event, the travel itinerary being stored in a memory of the mobile transceiver and defining a number of waypoints along a planned route and a wakeup frequency for each of the waypoints, wherein each of the waypoints define a location, and wherein the waypoints include an origin endpoint, and a destination endpoint and intermediate locations between the origin endpoint and destination endpoint; and
set one or more subsequent wakeup events based one or a combination of a time of the wakeup event, sensor data at the time of the wakeup event, and the determined waypoint.

* * * * *